J. WOLBER.
TROUSERS STRETCHER.
APPLICATION FILED MAR. 16, 1912.
1,065,995.
Patented July 1, 1913.
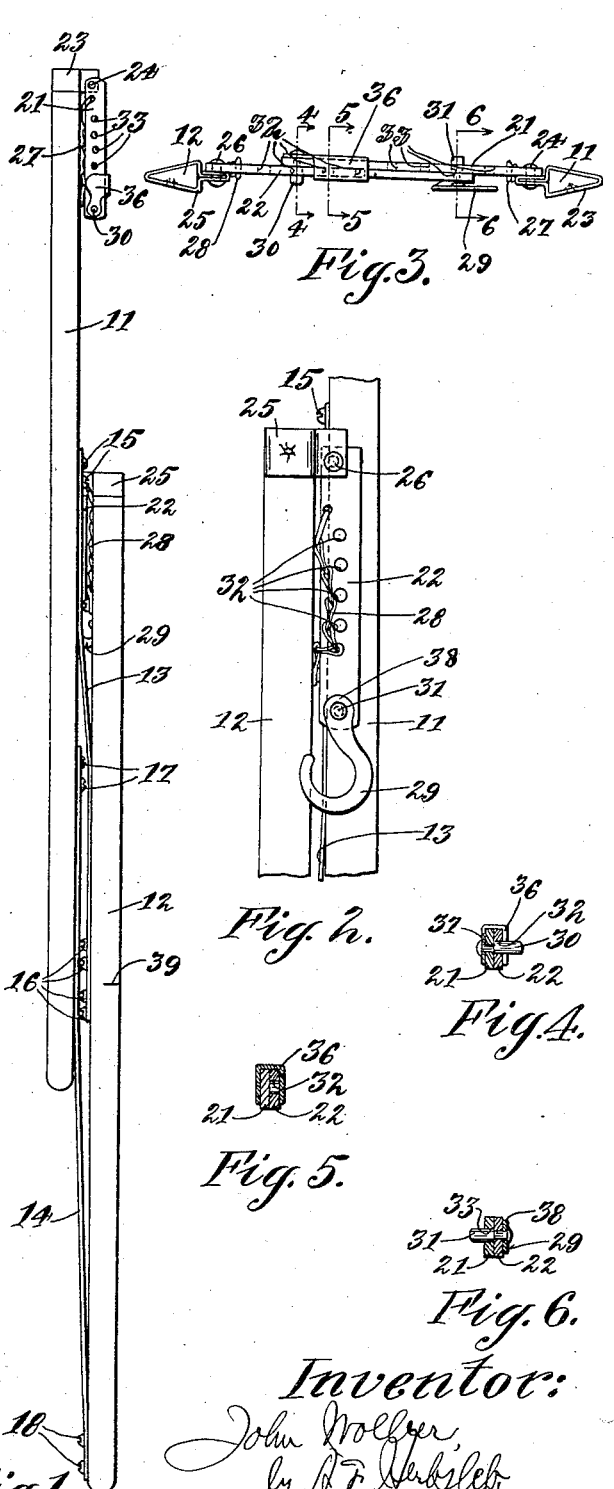
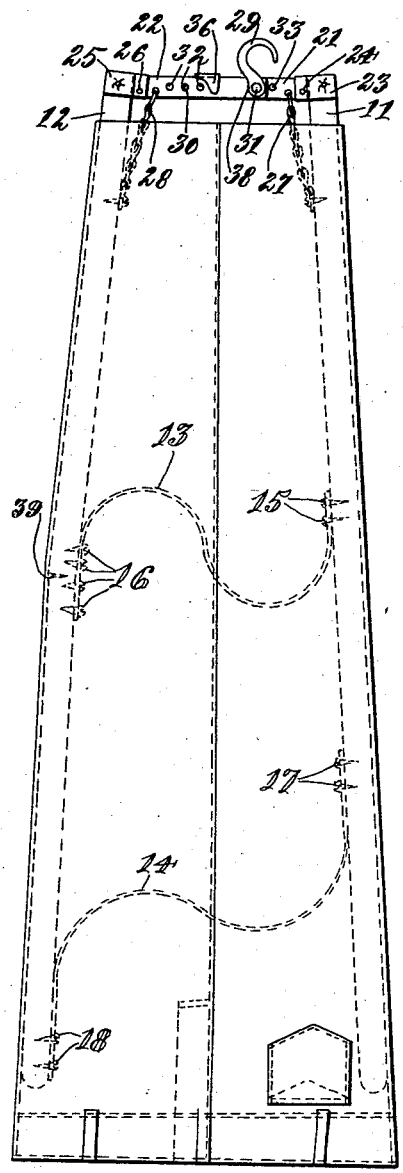

UNITED STATES PATENT OFFICE.

JOHN WOLBER, OF HAMILTON, OHIO.

TROUSERS-STRETCHER.

1,065,995.  Specification of Letters Patent.  Patented July 1, 1913.

Application filed March 16, 1912. Serial No. 684,189.

*To all whom it may concern:*

Be it known that I, JOHN WOLBER, a subject of the Emperor of Germany, residing at Hamilton, in the county of Butler and State of Ohio, have invented certain new and useful Improvements in Trousers-Stretchers, of which the following is a specification.

My invention relates to trousers stretchers, and has for its object the provision of a trousers stretcher arranged to occupy comparatively slight space in cross-section when in collapsed relation, and arranged to be located in expanded relation in the trousers leg for stretching the same.

The invention will be readily understood from the following description and claim, and from the drawings, in which latter:

Figure 1 is a side elevation of my improved device shown in collapsed relation. Fig. 2 is a detail in side elevation of a portion of the same, viewed from the side opposite to that shown in Fig. 1. Fig. 3 is a plan view of my improved device, shown in set-up relation. Fig. 4 is a cross-section of the same on the line 4—4 of Fig. 3. Fig. 5 is a cross-section of the same on the line 5—5 of Fig. 3. Fig. 6 is a cross-section of the same on the line 6—6 of Fig. 3; and, Fig. 7 is a side elevation showing my improved device in set-up relation in the trousers leg.

The stretcher embraces a pair of side strips, shown at 11, 12, forming stretcher-bars. Springs 13, 14, are secured to each of these bars, these springs being preferably flat springs, one above the other, the upper one of which is secured, as by screws 15, 16, to the middle portion of each of the stretcher-bars. The lower spring is secured at one of its ends by screws 17 to the stretcher-bar 11 between the end of said bar and the middle portion of the same. The other end of said last-named spring is secured by screws 18 to the end of the stretcher-bar 12.

The stretcher-bars and springs when in collapsed relation normally extend parallel with each other, with opposite ends of the stretcher-bars and preferably of the springs overlapping each other, so as to occupy as little lateral space as possible, the stretcher-bars and springs being arranged substantially parallel to each other.

21, 22, are connecting bars between the stretcher-bars, pivotally secured to the same, for instance by having a ferrule 23 secured to the end of the stretcher-bar 11, to which the connecting bar 21 is pivoted by a pin 24, and by having a ferrule 25 at the end of the stretcher-bar 12, to which the connecting bar 22 is pivoted on a pin 26.

Chains 27, 28, are attached between the respective connecting bars and the stretcher-bars for limiting the outward movements of the connecting bars. 29 is a hook pivoted to the connecting bar 22, by means of which the device with the trousers thereon is arranged to be suitably hung.

The connecting bar 21 has a pin 30 thereon, and the connecting bar 22 has a pin 31 thereon, arranged to be received respectively in apertures 32, 33, in the respective mating connecting bars.

36 is a connecting clamp pivoted to one of the connecting bars and arranged to be pushed over both the mating connecting bars when the mating connecting bars are in set-up relation for holding the parts together. The connecting clamp may have a pivotal bearing 37 about the pin 30, and the hook 29 may have a pivotal bearing 38 about the pin 31.

When it is desired to stretch the trousers leg, the device is slipped into the same and the stretcher-bars are respectively pulled and pushed in opposite directions lengthwise of each other, which brings the springs 13, 14, into curved form and preferably into S-form and under tension for normally separating the stretcher-bars. These stretcher-bars are moved longitudinally with relation to each other until their corresponding ends are opposite each other, the connecting bars 21, 22, having been meanwhile placed in positions at right angles to the stretcher-bars. When the corresponding ends of the stretcher-bars are opposite each other, the pin 30 is placed in one of the apertures 32 in the connecting bar 22 and the pin 31 is placed in one of the apertures 33 in the connecting bar 21, and the clamp 36 is pressed over both the connecting bars 21, 22, so as to lock the two together. This clamp is U-shaped in cross-section for engaging the outside faces of said connecting bars when the latter are located side by side. The device with the trousers thereon may then be hung by the hook 29, it being understood that there is one of these devices used for each trousers leg.

The stretcher-bar 12 has a slit 39 extending partway therethrough from its outer face, for permitting the said stretcher-bar to bend slightly at the knee-portion of the trousers, the spring 13 reinforcing said stretcher-bar at said slit by being secured to said stretcher-bar at both sides of said slit by the screws 16.

Having thus fully described my invention, what I claim as new and desire to secure by Letters Patent, is:

A trousers stretcher comprising a pair of normally depending stretcher-bars one of which is provided at its outer edge and lengthwise median portion with a cross-slit extending partway therethrough, a pair of flat stretcher-springs between said bars, the respective ends of said stretcher-springs rigidly secured to said bars, one of the ends of said stretcher-springs rigidly secured to the inner edge of that stretcher-bar in which said cross-slit is located both above and below said cross-slit, the said stretcher-bars and springs normally located in substantially parallel relation with their opposite ends overlapping and their corresponding ends in separated relations lengthwise of said stretcher-bars and springs, the said corresponding ends of said stretcher-bars arranged to be placed in positions substantially opposite each other with said springs arranged in S-form and exerting separating pressure between said bars, and said cross-slit and the end of said stretcher-spring thereacross forming a resiliently bending integral portion in said stretcher-bar in which said cross-slit is located when the trousers stretcher is in set-up relation, and suspending means for said trousers stretcher, substantially as described.

In testimony whereof, I have hereunto signed my name in the presence of two subscribing witnesses.

JOHN WOLBER.

Witnesses:
CONSTANT SOUTHWORTH,
THERESA SILBER.

---

Copies of this patent may be obtained for five cents each, by addressing the "Commissioner of Patents, Washington, D. C."